(12) United States Patent
Alasry et al.

(10) Patent No.: US 10,506,370 B1
(45) Date of Patent: Dec. 10, 2019

(54) SYSTEM AND APPARATUS FOR A CONTACT LIST IN A VEHICLE

(71) Applicant: DENSO International America, Inc., Southfield, MI (US)

(72) Inventors: Bilal Alasry, Dearborn, MI (US); Te-Ping Kang, Ann Arbor, MI (US); Vikas Upmanue, Novi, MI (US); Yu Zhang, Farmington Hills, MI (US); Jordan Necovski, Livonia, MI (US); Sean Bleicher, Fenton, MI (US); Doua Vang, Waterford, MI (US); Eleanor Duke, Sterling Heights, MI (US); Nicholaus Spunar, Canton, MI (US)

(73) Assignee: DENSO INTERNATIONAL AMERICA INC., Southfield, MI (US)

( * ) Notice: Subject to any disclaimer, the term of this patent is extended or adjusted under 35 U.S.C. 154(b) by 0 days.

(21) Appl. No.: 16/203,898

(22) Filed: Nov. 29, 2018

(51) Int. Cl.
| | | |
|---|---|---|
| H04W 4/02 | (2018.01) | |
| H04W 4/021 | (2018.01) | |
| H04W 4/90 | (2018.01) | |
| H04M 1/725 | (2006.01) | |
| G01C 21/34 | (2006.01) | |
| H04L 29/12 | (2006.01) | |
| G07C 5/00 | (2006.01) | |
| H04M 1/2745 | (2006.01) | |

(52) U.S. Cl.
CPC ........ *H04W 4/021* (2013.01); *G01C 21/3476* (2013.01); *G07C 5/008* (2013.01); *H04L 61/1594* (2013.01); *H04M 1/274533* (2013.01); *H04M 1/72572* (2013.01); *H04W 4/90* (2018.02)

(58) Field of Classification Search
CPC ............... H04L 67/104; H04L 61/1541; H04L 65/4076; H04L 67/327; H04W 4/029; H04W 4/021; H04W 4/023; H04W 4/60; H04W 12/00503; H04W 12/06; H04W 64/00; H04W 52/0254; H04W 68/00; H04M 1/72572; H04M 2250/10; H04M 15/06; H04M 15/8033; H04M 2215/32; H04M 2215/7435; H04M 2250/12
See application file for complete search history.

(56) References Cited

U.S. PATENT DOCUMENTS

| | | | |
|---|---|---|---|
| 7,212,111 B2 | 5/2007 | Tupler et al. | |
| 2010/0248744 A1* | 9/2010 | Bychkov | ............... H04W 4/185 455/456.2 |
| 2011/0092227 A1* | 4/2011 | Phukan | ........... H04M 1/274516 455/456.3 |

(Continued)

*Primary Examiner* — Quan M Hua
(74) *Attorney, Agent, or Firm* — Brooks Kushman P.C.

(57) ABSTRACT

A system in a vehicle comprises one or more transceivers configured to communicate data with a remote server, and a processor in communication with the transceiver and programmed to determine a location of the vehicle in response to data received from one or more sensors indicating a location of the vehicle/ The processor is further programmed to determine a trigger event associated with a point-of-interest (POI) in response to the data received from the remote server, receive data from the remote server indicating one or more contacts associated with the POI and locations of the one or more contacts, and output on a display a contact list in response to at least the data indicating the trigger event, wherein the contact list is generated utilizing at least the location of the one or more contacts.

17 Claims, 4 Drawing Sheets

(56) References Cited

U.S. PATENT DOCUMENTS

2014/0227991 A1     8/2014   Breton et al.
2014/0335814 A1*   11/2014   Gudlavenkatasiva .. H04W 4/90
                                                                    455/404.1

* cited by examiner

SYSTEM AND APPARATUS FOR A CONTACT LIST IN A VEHICLE

TECHNICAL FIELD

The present disclosure relates to an emergency contact list that may be utilized when an event occurs, such as an emergency situation.

BACKGROUND

Drivers or occupants in a vehicle may want to have a contact list in case of a vehicle emergency or in case of an errand or task that needs to be completed. A system may have access to information about the contact's location and schedule. Contacts in the contact list may be more useful than others depending on the situation of the emergency, the location of the emergency, and the availability of the emergency contacts.

SUMMARY

According to one embodiment, a vehicle system comprises one or more sensors configured to collect data indicating a location of the vehicle and vehicle environment, one or more transceivers configured to communicate the collected data with a database on a remote server, and a processor in communication with the transceiver. The processor is programmed to determine a location of the vehicle in response to the collected data indicating the location of the vehicle, determine a trigger event in response to the collected data indicating the vehicle environment, receive data from the remote server through the one or more transceivers indicating locations of one or more contacts associated with an occupant of the vehicle, and output on a display a contact list in response to identification of a trigger event, wherein the contact list is generated utilizing at least a location of the one or more contacts, and includes at least a primary contact for the trigger event.

According to one embodiment, a system in a vehicle comprises one or more transceivers configured to communicate data with a remote server, and a processor in communication with the transceiver and programmed to determine a location of the vehicle in response to data received from one or more sensors indicating a location of the vehicle/ The processor is further programmed to determine a trigger event associated with a point-of-interest (POI) in response to the data received from the remote server, receive data from the remote server indicating one or more contacts associated with the POI and locations of the one or more contacts, and output on a display a contact list in response to at least the data indicating the trigger event, wherein the contact list is generated utilizing at least the location of the one or more contacts.

According to one embodiment, a server comprises a transceiver configured to communicate data with a remote vehicle, and a processor in communication with the transceiver and programmed to send a request to message a mobile device of one more contacts associated with the remote vehicle in response to data received from the remote vehicle indicating a trigger event associated with a point of interest (POI), wherein the one or more contacts are determined in part by a distance to the POI.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In one example embodiment, a system may be utilized to optimize an emergency contact list (e.g. a SOS list). The SOS list or contact list may be utilized during an emergency at the vehicle or at another location. The system may provide users with a dynamic, up to date, contact list that is tailored based on a location or situation. Furthermore, certain embodiments may help avoid contacting an emergency contact that is unavailable or too far to facilitate in mitigating the event or emergency situation.

Figure 1:
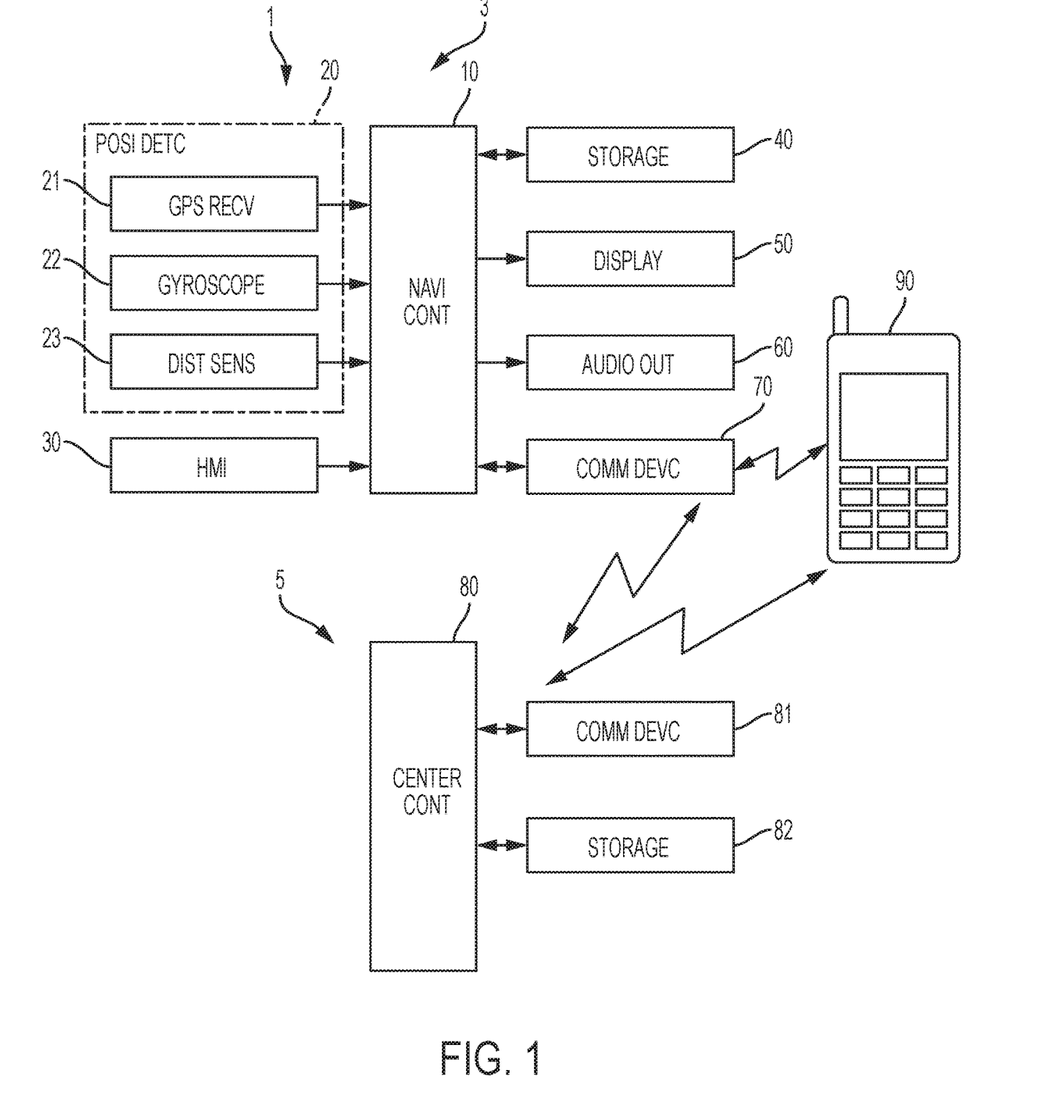
FIG. 1 is a vehicle system that includes a navigation apparatus that may be in communication with a data center.

As shown in FIG. 1, a vehicle system 1 includes a navigation apparatus 3 and a data center 5. The navigation apparatus 3 may be equipped in a vehicle and may include a navigation controller (NAVI CONT) 10 or processor. The navigation apparatus may be a portable terminal, such as a smart phone having a navigation function, other than a device equipped to a vehicle. The navigation apparatus may also be an off-board server or system that processes directions and maneuvers off-board that are to be sent to the vehicle. The route may be calculated using a remote service place and pushed into the vehicle storage. The navigation could be played as audio messages or visual indications (e.g. icons). Local position detectors (either on-board or off-board) may be utilized to match car's position to the route info. The navigation controller 10 may include a microcomputer, which has a central processing unit (CPU), a read only memory (ROM), a random-access memory (RAM), an input/output (I/O) interface and a bus line for coupling the CPU, the ROM, the RAM and the I/O interface. The navigation controller 10 may include a position detector (POSI DETC) 20, a user interface or human machine interface (HMI) 30, a storage 40, a display screen (DISPLAY) 50, an audio output device (AUDIO OUT) 60, and a communication device (COMM DEVC) 70. The position detector 20 may detect a present position of the vehicle. The user interface 30 may be used for inputting a command from a user to the navigation apparatus 3 or vehicle system 1. The storage 40 may store map data. The display screen 50 may display a map and various information to the user. The audio output device 60 may output audio guidance and sounds to occupants of the vehicle. The communication device 70 of the navigation apparatus 3 may communicate with an off-board server 5. Furthermore, the communication device 70 (or another communication device, such as a wireless transceiver as a Bluetooth transceiver), may be utilized to communication with a mobile device 90, such as a mobile phone. The mobile device 90 may be utilized for handsfree communication or other capabilities based on interoperability with the vehicle system 1.

The position detector 20 may receive signals transmitted from satellites for a global positioning system (GPS). The position detector 20 may include a GPS receiver (GPS RECV) 21, a gyroscope (DIST SENS) 22, and a distance sensor (DIST SENS) 23. The GPS receiver 21 may detect a position coordinate and an altitude of the present position of the vehicle. The gyroscope 22 outputs a detection signal corresponding to an angular velocity of a rotational motion applied to the vehicle. The distance sensor 23 outputs a traveling distance of the vehicle. The navigation controller 10 calculates the present position, a direction, and a velocity of the vehicle based on signals output from the GPS receiver 21, the gyroscope 22, and the distance sensor 23. Further, the present position may be calculated in various methods based on the output signal from the GPS receiver 21. For example, a single point positioning method or a relative positioning method may be used to calculate the present position of the vehicle.

The HMI 30 includes a touch panel and may include mechanical key switches. The touch panel is integrally set with the display screen 50 on the display screen or located away from the display such as in front of an arm rest. The mechanical key switches are arranged around the display screen 50. When the navigation apparatus 3 provides a remote-control function, operation switches for the remote control function are arranged in the HMI 30. The HMI 30 may also include a voice recognition system that utilizes voice prompts to operate various vehicle functions.

The storage 40, in which the map data is stored, inputs various data included in the map data to the navigation controller 10. The various data includes road data, facility data, point-of-interest (POI) data, address book data, and guidance data. The road data is indicative of a road connection status, and includes node data, which indicates a predetermined position such as an intersection, and link data, which indicates a link that connects adjacent nodes. The facility data is indicative of a facility on the map. The guidance data is used for route guidance. Address book data may be utilized to store custom contacts, locations, and other information (e.g. home or work). POI data may be utilized to identify a POI'S location, contact information, category information, review (e.g. Zagat or Yelp) information, etc. Examples of a POI may be a McDonald's under the category of a fast-food restaurant; Starbuck's under coffee shop, a Holiday Inn under the category of hotel, etc. Other POI examples may include, hospitals, dealerships, police stations, cleaners, etc. POIs may be independent business or corporate businesses.

The map data stored in the storage or "cloud" storage may be indicative of a map of an area. The map data is divided into one or more predetermined segment data elements, which are indicative of one or more predetermined segments included in the map of the area. The map data may include information on road names, road geometry, road function class, etc. Furthermore, the map data may include information regarding municipals (county lines, city lines, state lines, country borders, etc.), as well as bodies of water, park's, etc. Map data may also be updated through various processes. Thus, the storage 40 is configured to be rewritable in order to update the mesh data element. For example, a hard disk drive (HDD) and a flash memory may be used as the storage 40.

The display screen 50 may be a color display apparatus having a display surface such as a liquid crystal display. The display screen 50 displays various display windows according to video signal transmitted from the navigation controller 10. Specifically, the display screen 50 displays a map image, a guidance route from a start point to a destination, a mark indicating the present position of the vehicle, and other guidance information. The audio output device 60 may output audible prompts and various audio information to the user. With above-described configuration, the route guidance can be performed by displaying viewable information on the display screen 50 and outputting audible information with the audio output device 60.

The communication device 70 may communication data with the "cloud," for example, a data center 5. Specifically, the navigation apparatus 3 may be wirelessly coupled to a network via the communication device 70 so that the navigation apparatus 3 performs the data communication with the data center 5. The communication device 70 maybe an embedded telematics module or may be a Bluetooth transceiver paired with mobile device 90 utilized to connect to remote servers or the "cloud." The communication device 70 may be both a Bluetooth communication or another form of wireless (or wired) communication.

The server 5, which is remote from the vehicle, mainly includes a data center controller (CENTER CONT) 80. Similar to the navigation controller 10, the data center controller 80 mainly includes a well-known microcomputer, which has a CPU, a ROM, a RAM, an input/output interface and a bus line for coupling the CPU, the ROM, the RAM and the I/O interface. The data center controller 80 includes a communication device (COMM DEVC) 81, a first storage (FIR STORAGE) 82. The communication device 81 of the data center 5 performs the data communication with the navigation apparatus 3. Specifically, the data center 5 is wirelessly coupled to the network via the communication device 81 so that the data center 5 performs the data communication with the navigation apparatus 3.

The off-board server storage 82 inputs the various data into the data center controller 80. The various data may include POI data, the road data, the facility data, and crowd-sourced data (as explained in more detail below). The road data is indicative of a road connection status, and includes node data, which indicates a predetermined position such as an intersection, and link data, which indicates a link that connects adjacent nodes. The facility data is indicative of a facility on the map. The storage may also include point-of-interest (POI) information.

The off-board server storage may also include information regarding contacts or trusted sources of a user. For example, a phonebook or contact list may be stored on a remote-server storage (or in the vehicle or a mobile phone) that has information related to individual contacts. Such information may include name, address, phone number, relationship (e.g. spouse, child, colleague, etc.). The phonebook or contact list may be updated or edited based on user inputs. Additionally, the phonebook or contact list may be utilized for creating an SOS list that may be dynamically updated.

Figure 2:
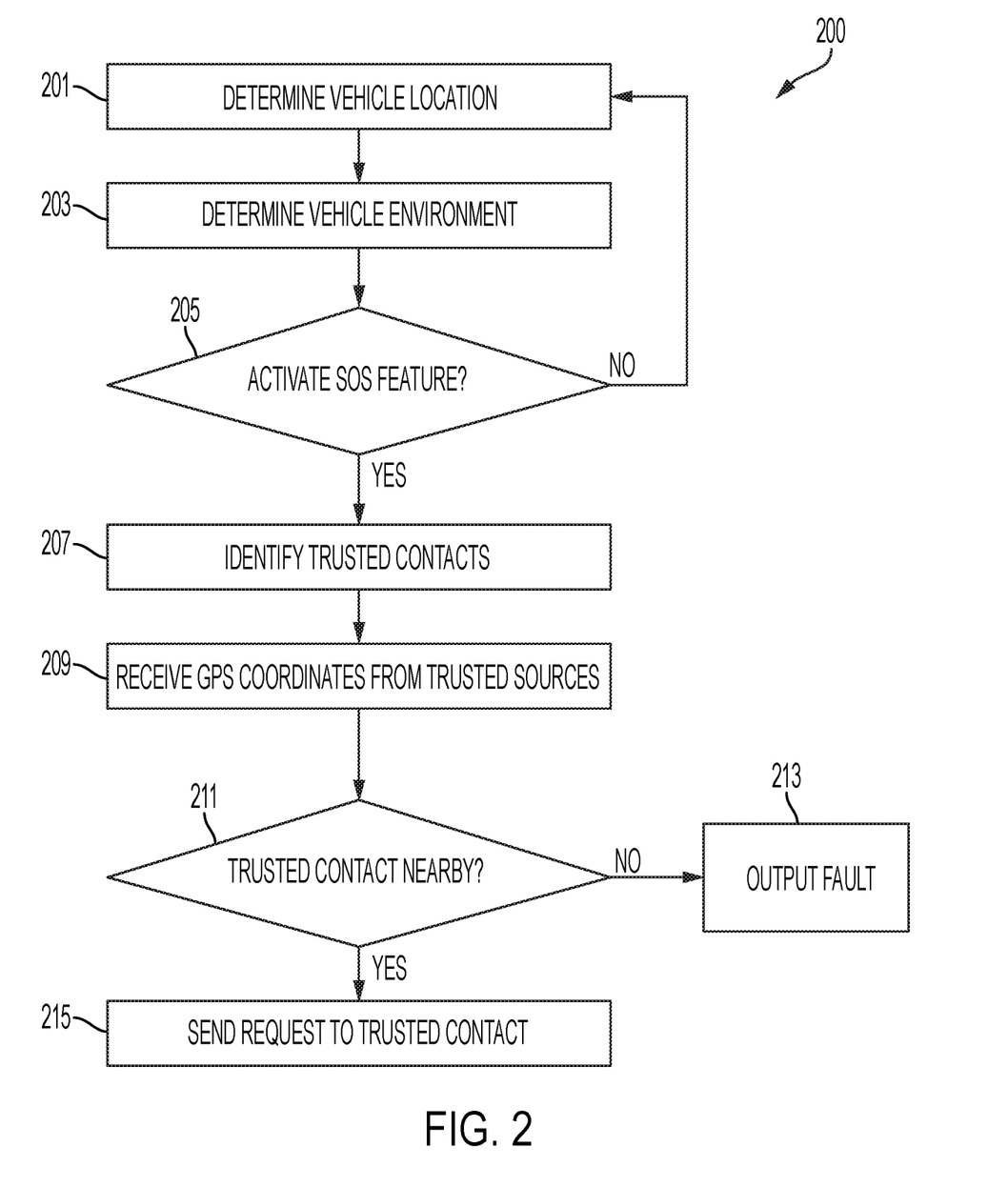
FIG. 2 is an overview of a flow chart for updating an SOS list dynamically based on the vehicle's environment or location.

FIG. 2 is an overview of a flow chart 200 for updating an SOS list dynamically based on the vehicle's environment or location. The steps in the flow chart may be implemented on a processor in a vehicle, remote server, mobile device, or other type of computer. The system may determine the vehicle's location and/or the vehicle's environment at step 201. The system may utilize GPS signal to determine a location of a vehicle or a cellular phone associated with a driver or user. The coordinates may be sent to a remote server which may be utilized for processing.

The system may first determine whether to update or activate an SOS list based on the vehicle's environment. In some embodiments, the SOS list may be constantly updated, while in other embodiments the SOS list feature may require activation. Activation may be done automatically based on the vehicle's environment or location. For example, the vehicle system may utilize the map database information to determine that the vehicle is in a high-crime rate area and thus activate the dynamic activation of the SOS list. In another embodiment, the vehicle system may monitor maintenance and diagnostic information of the vehicle to determine if the vehicle is having an emergency-event or may need to be serviced soon. As such, the vehicle system may receive data or other information from vehicle sensors to determine there is an issue with the vehicle. Such issues may include low-tire pressure, low-fuel, low oil pressure, engine errors, etc. In yet another embodiment, the system may require manual activation.

The system may determine whether to activate the setting at step 205. The system may analyze both the vehicle location, user location (e.g. mobile device location), and the vehicle environment to determine whether the SOS contact list should be displayed or updated. In certain embodiments, the system may analyze either a location of the user (or vehicle) or the vehicle environment. Attributes that exceed a threshold may then activate the SOS contact list to be updated and displayed on a screen in the vehicle or mobile device. For example, the system may determine that a vehicle malfunction (e.g. engine issue, tire pressure low, etc.) should invoke activation in the system. In another example, the vehicle location may indicate that the SOS contact feature should be invoked. For example, if the SOS feature indicates that the vehicle or a user is in a dangerous area that has a high crime rate as indicated by map data, it may automatically invoke the feature. If the system determines that the SOS contact feature does not need to be invoked, it may continue to monitor the vehicle conditions and vehicle environment.

The system may then identify trusted contacts based on the vehicle environment at 207. A user of a vehicle at one time may have identified trusted sources (in general, not specific to a situation or location) to call in a vehicle emergency. The system may gather the information on the trusted contacts to utilize to narrow down a list of appropriate contacts specific to a situation, rather than a generalized list. For example, it may be more applicable to call a nanny/care giver for a child emergency, than a colleague. In another example, when service of the vehicle needed, it may be more appropriate to contact a handy man or friend that is familiar with vehicle repairs.

The system may then receive a location from the trusted contacts at 209. The trusted contacts may have a cell-phone with location-based services that allows GPS coordinates to be shared. In other embodiments, the trusted contact may have a vehicle associated with the contact that can provide GPS coordinates to the vehicle via communication to a remote server. The system may utilize the locations of the trusted contacts as a factor for determining whether to utilize the contact in the dynamic SOS list. Other factors may include the travel time for the contact to arrive at the POI, traffic associate with the POI, schedule/calendar of the contacts, etc. The trusted contacts may opt-in to allowing their locations to be shared.

The system may then compare a location of the trusted sources to the vehicle's current location at 211. In another embodiment, the system may also compare the schedule of the trusted source to determine availability. For example, the system may have access to a calendar of a trusted contact. The calendar may identify appointments and availability of the trusted contact via data that is communicated to a remote server in communication with the system. If no trusted contact is available, the system may output a message that no trusted contact is available at step 213. If no trusted contact is available, an option for emergency responder or dispatch may be prompted for a user. For example, the system may ask a user if they wish to dial an emergency responder, fire department, hospital, emergency medical technician, roadside assistance, etc. when no trusted contact is available or within a vicinity of the vehicle or user.

The system may then output on a vehicle display an updated SOS list based on the factors described above at step 215. The SOS list that is displayed may have a numeric ordering of trusted contacts to dial based on a prioritization that may utilize the location of the vehicle and the current situation of the vehicle. In another embodiment, the system may show only a single contact to dial rather than multiple contacts. An associated map location of the trusted contact that is selected may also be shown to notify a driver or user of the vicinity of the trusted contact(s).

Figure 3:
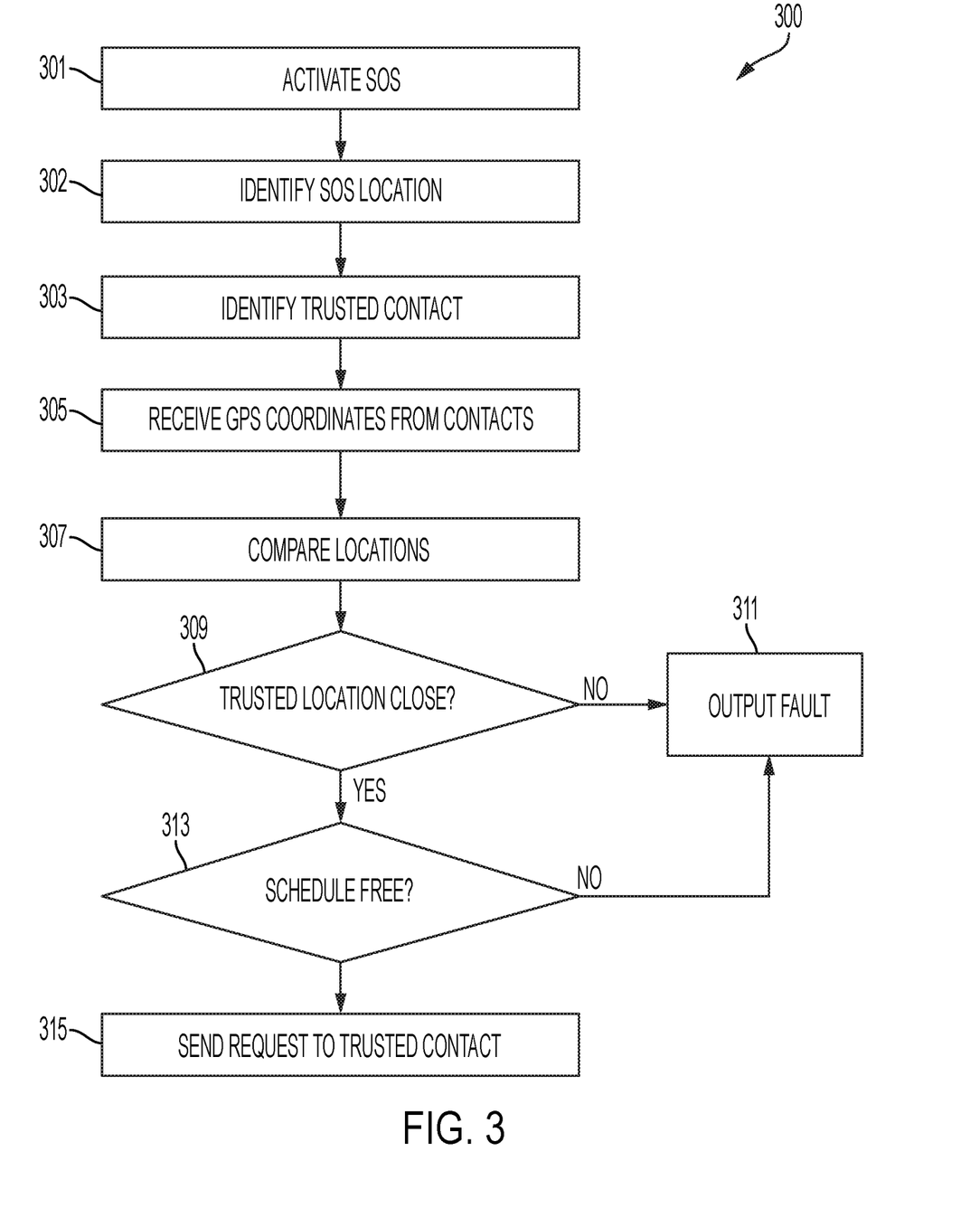
FIG. 3 is an overview of a flow chart of updating an SOS list dynamically based on a point-of-interest (POI).

FIG. 3 is an overview of a flow chart for updating an SOS list dynamically based on the vehicle's environment or location. The system may determine whether to activate the SOS setting or not activate the setting at step 301. The SOS setting may be utilized to create a dynamic, tailored list in events or emergency situations. The system may automatically activate the feature in one scenario, while another embodiment may allow for manual activation. Automatic activation may occur based on a request from a trusted party or contact (e.g. spouse, child, other family member, trusted person, etc.) In another embodiment, manual activation may be utilized to activate the feature.

At step 302, the system may identify a sensitive location that should have an emergency list. The sensitive location may not necessarily be near a user or a vehicle, thus it may be a remote location. The sensitive location may be a POI or an area associate with a map. A user interface associated with the vehicle or a mobile device may be utilized to setup associated contacts with that POI or location. For example, a POI that is identified as a sensitive location may be considered a home area. A contact list for the home area may include owners of the home, family of the home owners, a handy man, etc. In another embodiment, a POI may include a work area. A contact list for the work area may include colleagues or a staff associated with the work area.

The system may then identify trusted contacts at step 303. A user of a vehicle at one time may have identified trusted sources (in general, not specific to a situation or location) to call in a vehicle emergency. The system may gather the information on the trusted contacts to utilize to narrow down a list of appropriate contacts specific to a situation, rather than a generalized list. The trusted contacts may be associated with specific POI locations in flow chart 300. For example, it may be more applicable to call a nanny/care giver for a child emergency, than a colleague. Thus, a school location or day care location may have certain contacts associate with that location versus another location. In another example, a work location may have a contact list of colleagues and secretaries. In another example, for a home location, it may be more appropriate to include a handy man.

At step 305, the system may receive GPS coordinates from the contacts. The system may then receive GPS coordinates of the trusted sources. The GPS coordinates may be utilized to identify a location of the one or more trusted contacts. The location data may be utilized to determine an optimal contact to reach out to in the event of an emergency. The trusted contacts may also have a cell-phone with location-based services that allows GPS coordinates to be shared. In other embodiments, the trusted contact may have a vehicle associated with the contact that can provide GPS coordinates to the vehicle via communication to a remote server. The system may utilize the locations of the trusted contacts as a factor for determining whether to utilize the contact in the dynamic SOS list.

At step 307 the system may compare the locations of the trusted contacts with that of the POI location. Each of the contacts that are associated with the POI may be compared to one another to compare a distance between each contact and the POI. Each contact and the POI may be compared and then later analyzed to see which contact may be furthest from the POI, as well as which contact is closest to the POI. Furthermore, traffic scenarios and estimated time of arrival of the trusted contacts to the POI may be analyzed to better determine whether a trusted contact may be able to respond to a trigger event in time.

At step 309, the comparison of the contact to the location may be analyzed to see if it falls below a threshold distance. For example, the system may analyze the comparison to see if a contact is located too far away to help facilitate with the event at the POI location. Route information may also be analyzed between the contact and the POI. The system may compare the distances or estimated time to arrival for each contact to arrive at the POI to conduct a first step or prioritizing the list. The system may also automatically remove any contacts from the list if the distance or estimated time to arrival exceeds a threshold value that may be system defined or defined by a user. The contact may later be utilized if the comparison indicates a threshold value below the threshold distance or time to the POI location.

In an event that the trusted location does not have any close contacts, the system may output a fault message at step 311. If no trusted contact is available, the system may output a message that no trusted contact is available. If no trusted contact is available, an option for emergency responder or dispatch may be prompted for a user. For example, the system may ask a user if they wish to dial an emergency responder, fire department, hospital, emergency medical technician, roadside assistance, etc. when no trusted contact is available or within a vicinity of the POI. Thus, the system may still provide an ability to contact an emergency responder if no one in the trusted contact list is available.

Figure 4:
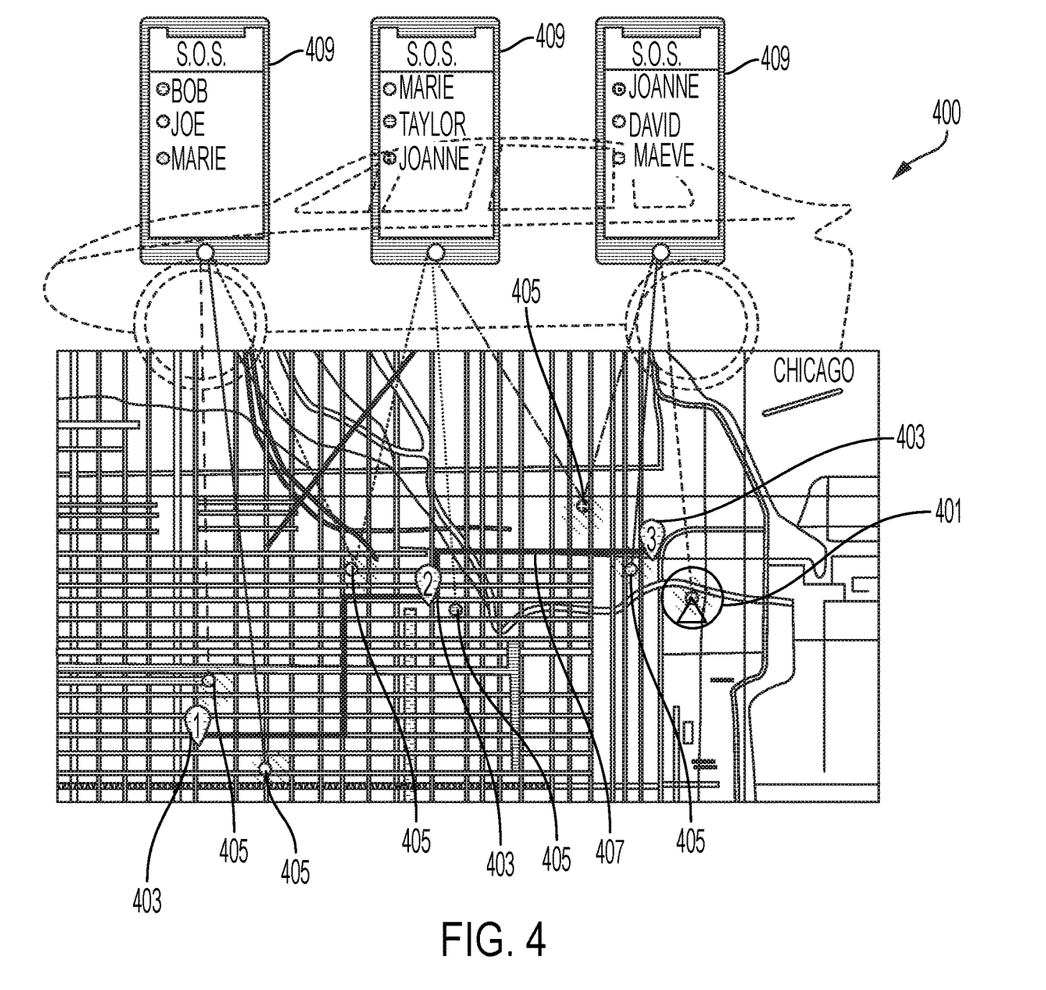
FIG. 4 is an example of a vehicle display in view of such dynamically displayed SOS lists.

At step 313, the system may then analyze a schedule of the trusted contacts. The trusted contacts schedule or calendar may be sent to a remote server. The remote server may communicate with the system to be utilized to optimize the contact list. In one example, a trusted contact may be located near a POI that requires emergency assistance. However, the schedule or calendar data of that contact may indicate that the user is currently unavailable. The system may evaluate the other contacts to determine if a better situation contact is available. In another scenario, the system may output a prompt asking to send a request despite the calendar data of the contact indicating the contact is unavailable. The system may identify a primary contact that is identified on the contact list. The primary contact may be indicated as the best suited to handle the trigger event or emergency situation. The primary contact may be identified utilizing at least data indicating that the location of the primary contact is nearby, the estimated time of arrival of the primary contact is the quickest to arrive, or that the primary contact is best suited to handle such a trigger event. In another scenario, the map data associated with the map 400 may indicate areas of high-crime or heightened security measures. For example, a trigger event may occur that requires heightened security, such as the vehicle entering an area of high-crime, severe weather, national disaster, or other type of emergency or event.

The system may then send a request to the SOS contact based on the list at step 315. The request may include a message to the contact regarding the emergency, a location of the POI, directions to the POI, or other information. Furthermore, a phone call may be automated to the SOS contact. In another embodiment, the SOS list may be output or displayed on a mobile phone or vehicle display. The SOS list may have a numeric ordering of trusted contacts to dial based on the location of the vehicle and the current situation of the vehicle. In another embodiment, the system may show only a single contact to dial rather than multiple contacts. An associated map location of the trusted contact that is selected may also be shown. It should be noted that as the driver or user continue to move locations or drive, the list may be constantly updated based on the environment of the user and the location of the contacts. A display indicating the various contacts on the list may be output and updated as the location of the vehicle or user changes.

FIG. 4 is an example of an output screen displaying a map 400 and SOS list. The output screen or map 400 may be utilized to visualize a vicinity of a user or a vehicle. The map 400 may display various POIs, street geography, street names, city names, etc. The map may also be utilized to show traffic flow information, as well as traffic construction info. The map may identify a current vehicle position (CVP) icon 401 utilizing GPS coordinates to determine where a vehicle is currently located. The CVP icon 401 may also in the alternative show an indicator of a location of a user utilizing a mobile device or other type of tracking device. The map 400 can be overlaid over the CVP 401 to show where a user or driver is in proximity to other POIs, cities, streets, etc.

The map 400 may also include POIs 403 that are identified by a user. The POIs 403 may be locations that are frequently visited by a user, although it is not required to be frequently visited. In some scenarios, the POIs 403 may include a home, work, school, spouse workplace, etc. A user may be able to associate various contacts with each POIs 403 in one embodiment. For example, a child's parent or grand parents may be associated with a school that is identified as a POI. For home, the home owners may be identified as a contact. For a POI that may be work, a colleague or secretary may be identified.

The map may be able to show the various contacts 405 of the user. The contacts 405 may be shown whether or not they are near an associated POI 403. The contacts may be individualized for each POI to tailor the needs of an event or emergency that may occur at the POI. In another example, the POI 403 may not have an associated contact attributed to it. However, the map may be able to display a general contact that is near the vicinity of that POI. For example, a user may need to go grocery shopping and identify that a contact is available near the grocery store. A message may be pushed to that contact to pick up groceries for the user.

A route 407 may be displayed on the map 400. The route may be utilized to show a route for a dedicated contact to an associated POI for that contact. For example, the route may be utilized to show what route a nanny is taking to get to school to pick up a child that experienced an event at school. The route 407 may also be utilized to help determine if a contact, although closer to the associated POI than another contact, may take longer to arrive to the POI based on traffic or the route. For example, a contact may be located on one side of town experiencing heavy traffic, which makes it optimal to identify another contact as that primary contact for the POI. In another example, a contact may be located in an area that requires all residential streets to arrive at the POI, versus another contact that can take a freeway to arrive at the POI (which is in turn likely faster). Such information can be utilized to optimize the SOS list.

The contact list 409 may be displayed on a map display located in a vehicle or on a mobile phone of a user. The contact list 409 may also be pushed to the contacts on the list that are prioritized when an emergency event occurs. The contacts may then select whether they are available or not to better suit the contact list to be refreshed/updated. The system may identify a primary contact that is identified on the contact list. The primary contact may be indicated as the best suited to handle the trigger event or emergency. The primary contact may be identified utilizing at least data indicating that the location of the primary contact is nearby, the estimated time of arrival of the primary contact is the quickest to arrive, or that the primary contact is best suited to handle such a trigger event. As shown in FIG. 4, a list may be displayed indicating a recommendation of priority in the one or more contacts.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A vehicle system, comprising:
one or more sensors configured to collect data indicating a location of the vehicle and vehicle environment;
one or more transceivers configured to communicate the collected data with a database on a remote server; and
a processor in communication with the transceiver and programmed to:
determine a location of the vehicle in response to the collected data indicating the location of the vehicle;
determine a trigger event in response to the collected data indicating the vehicle environment;
receive data from the remote server through the one or more transceivers indicating locations of one or more contacts associated with an occupant of the vehicle;
and output on a display a contact list in response to identification of the trigger event, wherein the contact list is generated utilizing at least a location of the one or more contacts, and includes at least a primary contact for the trigger event.

2. The vehicle system of claim 1, wherein the contact list is generated utilizing at least a location of the one or more contacts, and includes at least a primary contact for the trigger event.

3. The vehicle system of claim 2, wherein the processor in communication with the transceiver is further programmed to send a notification to a mobile device associated with the primary contact in response to the data indicating the location of the primary contact is below a threshold distance from the vehicle.

4. The vehicle system of claim 1, wherein the contact list includes data indicating contact information for one or more contact names and associated numbers.

5. The vehicle system of claim 1, wherein the contact list is generated utilizing at least the location of the vehicle.

6. The vehicle system of claim 1, wherein the processor is further programmed to receive user profile information from the vehicle that identifies the occupant of the vehicle, and the contact list is generated utilizing at least the user profile information.

7. The vehicle system of claim 6, wherein the user profile information is obtained from a mobile device or key fob associated with the vehicle.

8. The system of claim 1, wherein the data indicating that the vehicle is in the trigger event includes data indicating low fuel of the vehicle.

9. The system of claim 1, wherein the data indicating that the vehicle is in the trigger event includes data indicating low tire pressure of the vehicle.

10. The system of claim 1, wherein the data indicating that the vehicle is in the trigger event includes map data indicating the location of the vehicle is in a high crime area.

11. A system in a vehicle, comprising:
one or more transceivers configured to communicate data with a remote server; and
a processor in communication with the transceiver and programmed to:
determine a location of the vehicle in response to data received from one or more sensors indicating a location of the vehicle;
determine a trigger event associated with a point-of-interest (POI) in response to data received from the remote server;
receive data from the remote server indicating one or more contacts associated with the POI and locations of the one or more contacts; and
output on a display a contact list in response to at least the data indicating the trigger event, wherein the contact list is generated utilizing at least the location of the one or more contacts.

12. The system of claim 11, wherein the trigger event includes data indicating low fuel of the vehicle.

13. The system of claim 11, wherein the trigger event includes data indicating low tire pressure of the vehicle.

14. The system of claim 11, wherein the trigger event includes map data indicating the location of the vehicle is in a high crime area.

15. The system of claim 11, wherein the contact list is generated utilizing at least calendar information of the one or more contacts.

16. The system of claim 11, wherein the processor is further programmed to receive user profile information from the vehicle that identifies an occupant of the vehicle, and the contact list is generated utilizing at least the user profile information.

17. The system of claim 16, wherein the user profile information is obtained from a mobile device or key fob associated with the vehicle.

* * * * *